(12) United States Patent  
Kemmerer et al.

(10) Patent No.: US 6,270,167 B1
(45) Date of Patent: Aug. 7, 2001

(54) VEHICLE WHEEL COVER RETENTION SYSTEM AND METHOD FOR PRODUCING SAME

(75) Inventors: James H. Kemmerer, Sweet Springs; Daniel Wuebker, Hughesville, both of MO (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/636,240

(22) Filed: Aug. 10, 2000

Related U.S. Application Data

(63) Continuation of application No. PCT/US99/02888, filed on Feb. 11, 1999.
(60) Provisional application No. 60/074,367, filed on Feb. 11, 1998, and provisional application No. 60/074,374, filed on Feb. 11, 1998.

(51) Int. Cl.[7] ........................................................ B60B 7/06
(52) U.S. Cl. ..................................... 301/37.43; 301/37.36
(58) Field of Search ............................... 301/37.1, 37.36, 301/37.35, 37.43; 29/894.38, 894.381

(56) References Cited

U.S. PATENT DOCUMENTS

| 2,158,125 | * | 5/1939 | Horn et al. ........................... 301/37.1 |
| 3,726,566 | | 4/1973 | Beith . |
| 5,435,631 | | 7/1995 | Maloney et al. . |
| 5,564,791 | * | 10/1996 | Chase et al. ................... 301/37.43 X |
| 5,595,423 | | 1/1997 | Heck et al. . |
| 5,664,845 | * | 9/1997 | Maloney et al. ................... 301/37.43 |
| 5,820,225 | * | 10/1998 | Ferriss et al. ........................ 301/37.1 |
| 5,829,843 | * | 11/1998 | Eikhoff ............................... 301/37.43 |

FOREIGN PATENT DOCUMENTS 2848790  5/1980 (DE) .

* cited by examiner

*Primary Examiner*—Russell D. Stormer
(74) *Attorney, Agent, or Firm*—MacMillan, Sobanski & Todd, LLC

(57) ABSTRACT

An improved vehicle wheel cover retention system and method for producing the same includes a wheel disc and a wheel cover secured thereto. The wheel disc defines an outboard facing wheel surface and includes an outboard tire bead seat retaining flange. The outboard bead seat retaining flange includes an outer peripheral end and an inner surface having at least one annular groove formed therein. The wheel cover covers at least a portion of the outboard facing wheel surface and the entire portion of the outer peripheral end of the outboard bead seat retaining flange, and includes an outer end. The wheel cover is secured to the wheel disc by an adhesive/sealant. In particular, the adhesive/sealant is disposed in the annular groove to secure the outer end of the wheel cover to the outer peripheral end of the wheel disc and to provide a seal to prevent water, mud, salt and other debris from entering between the outer end of the wheel cover and the outer peripheral end of the wheel disc.

20 Claims, 14 Drawing Sheets

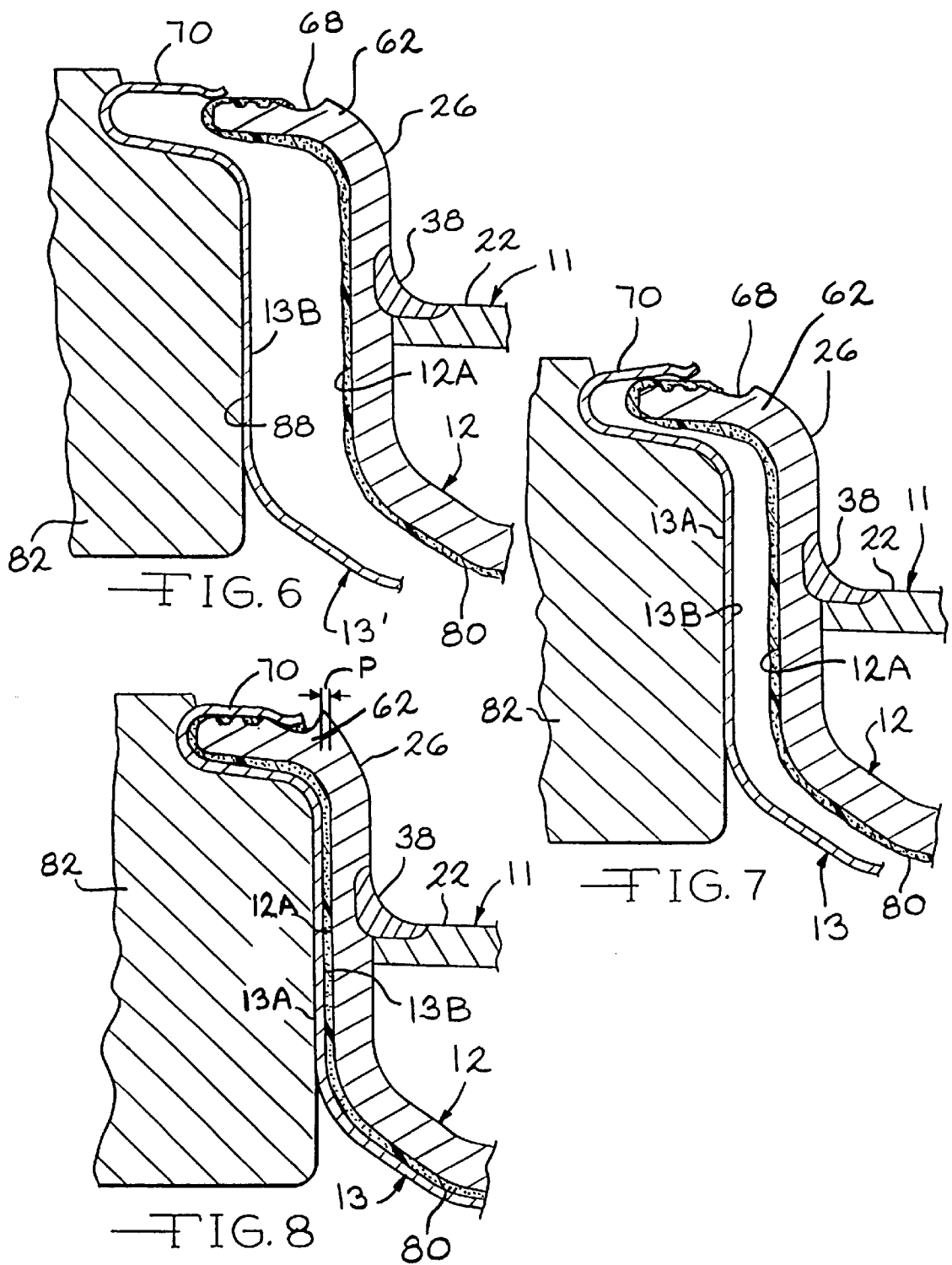

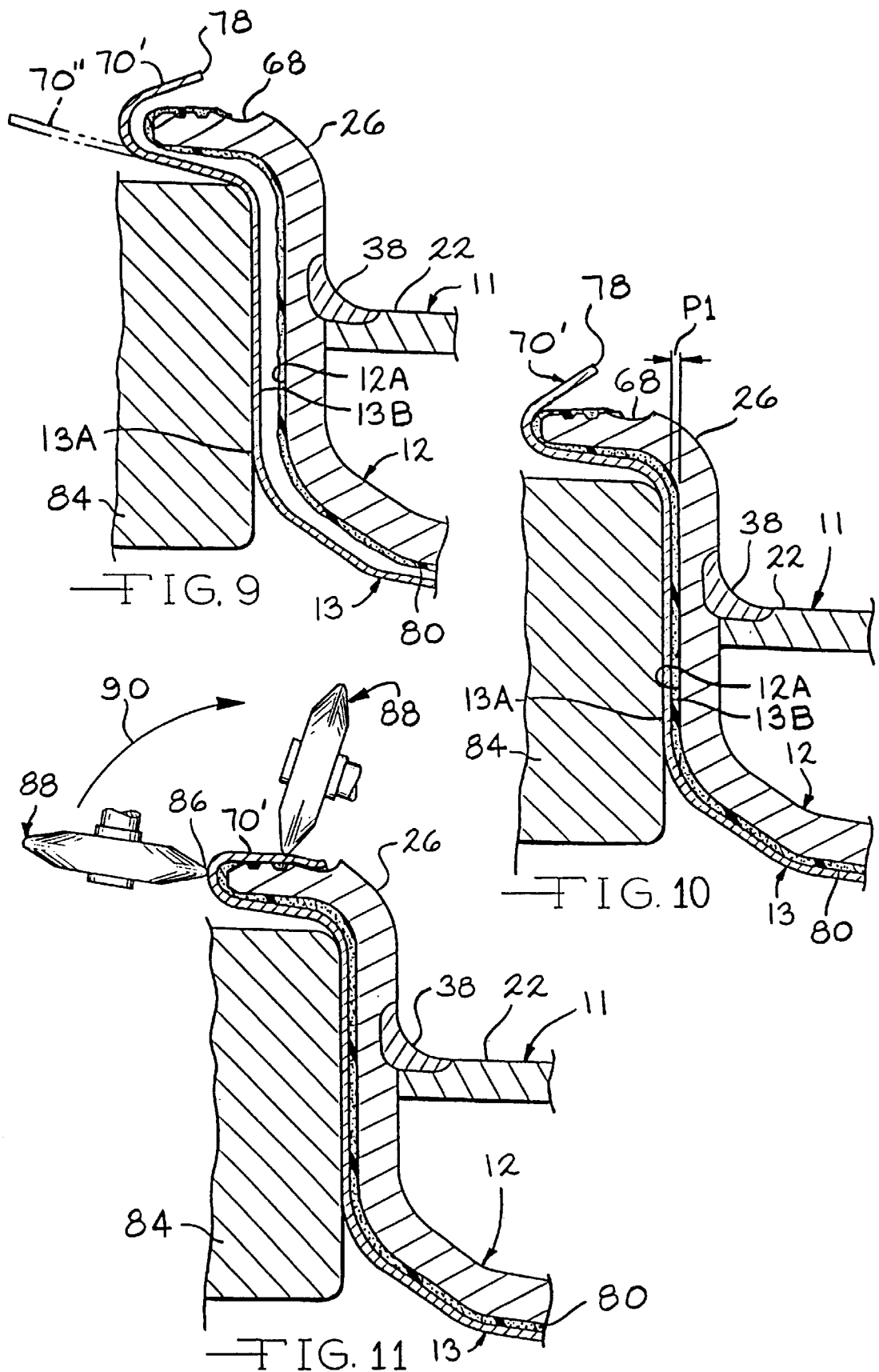

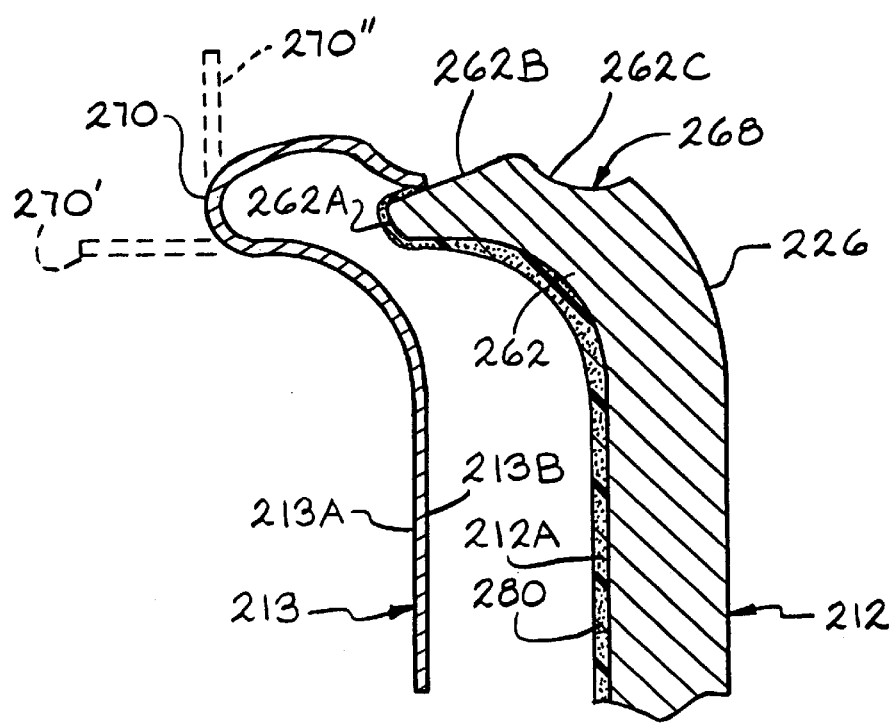
FIG. 16
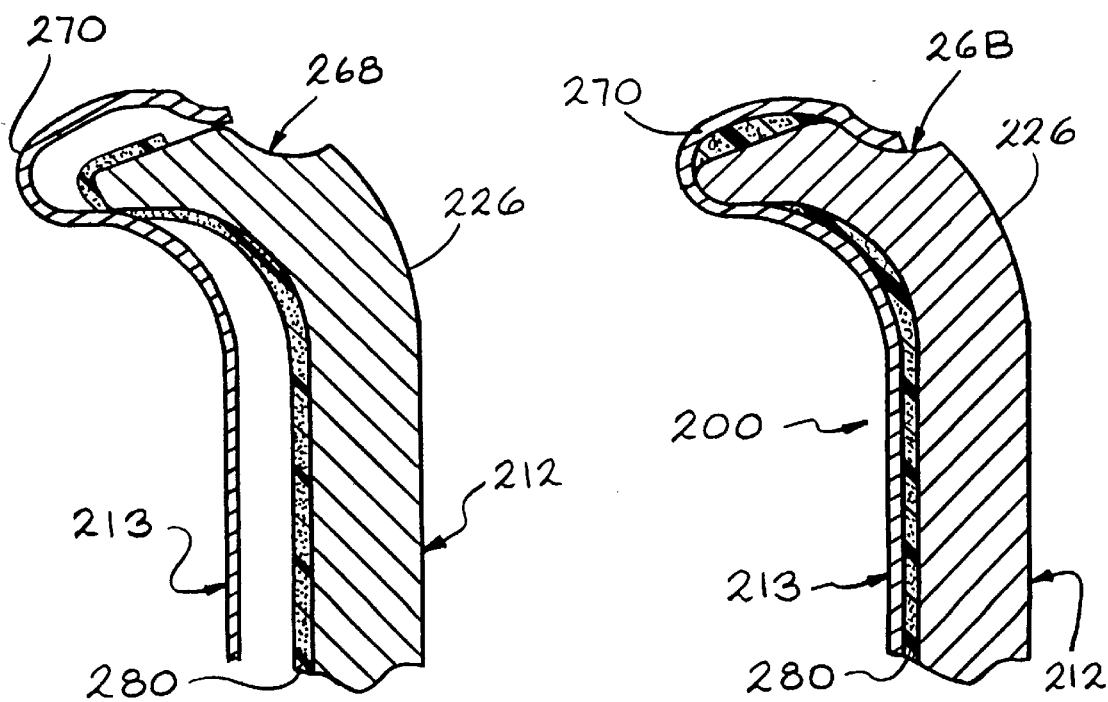
FIG. 17
FIG. 18

6,270,167 B1

VEHICLE WHEEL COVER RETENTION SYSTEM AND METHOD FOR PRODUCING SAME

CROSS REFERENCE TO RELATED APPLICATIONS

This application claims the benefit of U.S. Provisional Application Serial No. 60/074,367, filed Feb. 11, 1998, U.S. Provisional Application Serial No. 60/074,374, filed Feb. 11, 1998, and International Application No. PCT/US99/02888, filed Feb. 11, 1999.

BACKGROUND OF THE INVENTION

This invention relates in general to vehicle wheels and in particular to an improved vehicle wheel cover retention system and method for producing the same.

Full or partial vehicle wheel covers of the removable type are well known., and have been used for many years to enhance the styling of conventional, stamped wheel discs. Also, it is known to permanently secure a full or partial wheel cover to a vehicle wheel using an adhesive.

One example of a vehicle wheel with a permanently secured wheel cover is disclosed in U.S. Pat. No. 5,595,423 to Heck et al. In the Heck et al. patent, a wheel cover includes an outer annular lip which extends into a groove formed in an inner surface of an outer peripheral end of the outboard tire bead seat retaining flange of a wheel disc.

Another example of a vehicle wheel having a permanently secured wheel cover is disclosed in U.S. Pat. No. 3,726,566 to Beith. In the Beith patent, a wheel cover includes a terminal flange lip which is formed to grip an edge of a terminal flange of the wheel rim to aid in fixing the wheel cover to the wheel.

SUMMARY OF THE INVENTION

This invention relates to an improved vehicle wheel cover retention system and method for producing the same. In particular, the vehicle wheel includes a wheel disc defining an outboard facing wheel surface and including an outboard tire bead seat retaining flange. The outboard bead seat retaining flange includes an outer peripheral end and an inner surface having at least one annular groove formed therein. The vehicle wheel further includes a wheel cover which covers at least a portion of the outboard facing wheel surface and the entire portion of the outer peripheral end of the outboard bead seat retaining flange. The wheel cover includes an outer end. The wheel cover is secured to the wheel disc by an adhesive/sealant. In particular, the adhesive/sealant is disposed in the annular groove to secure the outer end of the wheel cover to the outer peripheral end of the wheel disc and to provide a seal to prevent water, mud, salt and other debris from entering between the outer end of the wheel cover and the outer peripheral end of the wheel disc.

Other advantages of this invention will become apparent to those skilled in the art from the following detailed description of the preferred embodiments, when read in light of the accompanying drawings.

BRIEF DESCRIPTION OF THE DRAWINGS

FIG. 6 is a sectional view of the selected portion of the vehicle wheel illustrated in FIG. 2, and showing the initial installation operation of the wheel cover.

FIG. 7 is a sectional view showing an intermediate installation operation of the wheel cover in FIG. 6.

FIG. 8 is an enlarged sectional view showing the final installation operation of the wheel cover illustrated in FIG. 6.

FIG. 9 is a sectional view of an embodiment of the wheel cover illustrated in FIG. 5 and showing the initial installation operation of the wheel cover.

FIG. 10 is a sectional view showing an intermediate installation operation of the wheel illustrated in FIG. 9.

FIG. 11 is a sectional view showing the final installation operation of the wheel cover illustrated in FIG. 9.

FIG. 16 is a sectional view showing an initial installation operation of the wheel cover illustrated in FIG. 15.

FIG. 17 is a sectional view showing an intermediate installation operation of the wheel cover illustrated in FIG. 15.

FIG. 18 is a sectional view showing the final installation operation of the wheel cover illustrated in FIG. 15.

DETAILED DESCRIPTION OF THE PREFERRED EMBODIMENTS

Figure 1:
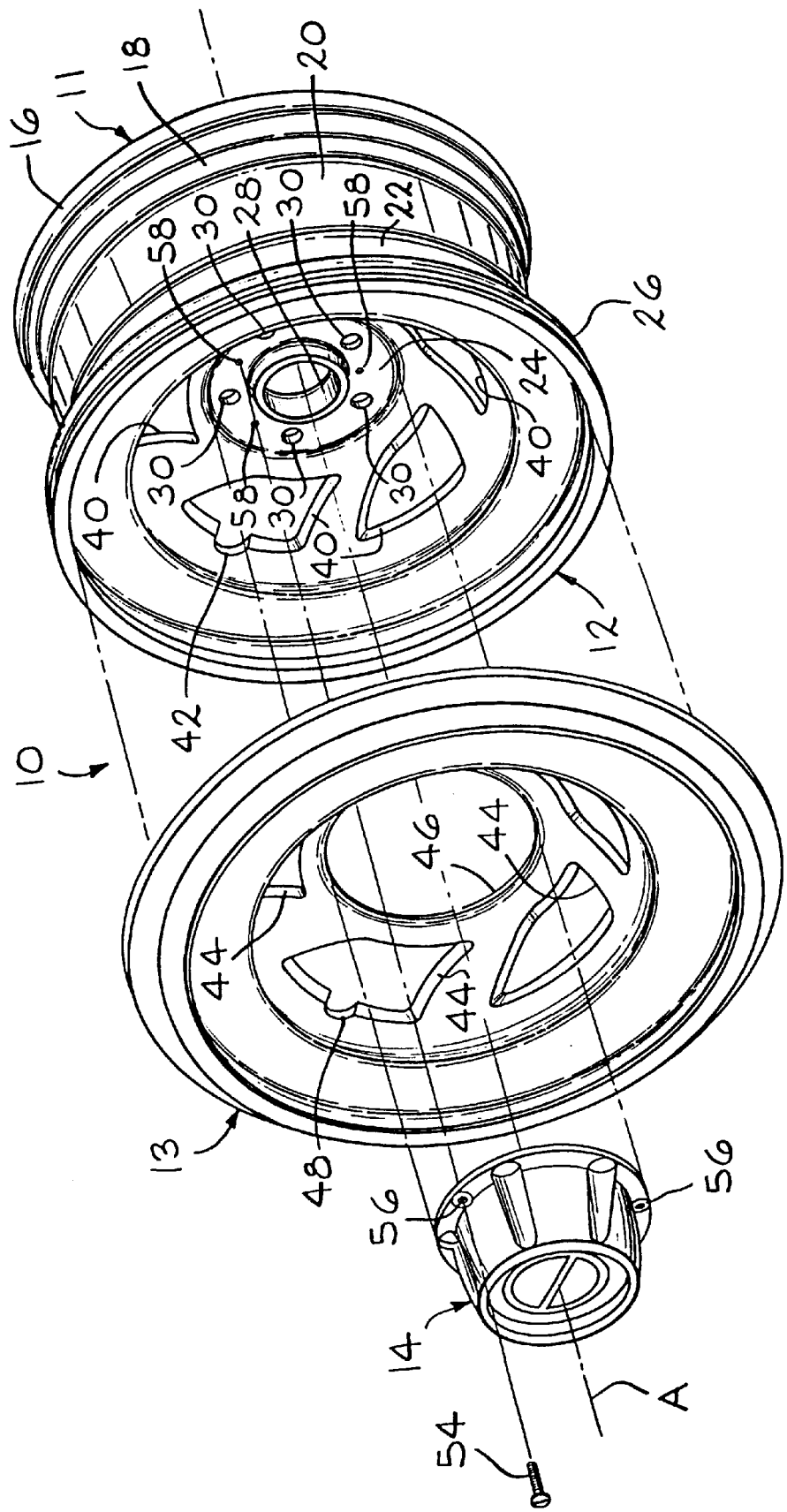
FIG. 1 is an exploded perspective view of a first embodiment of an improved vehicle wheel constructed in accordance with the present invention.
Figure 3:
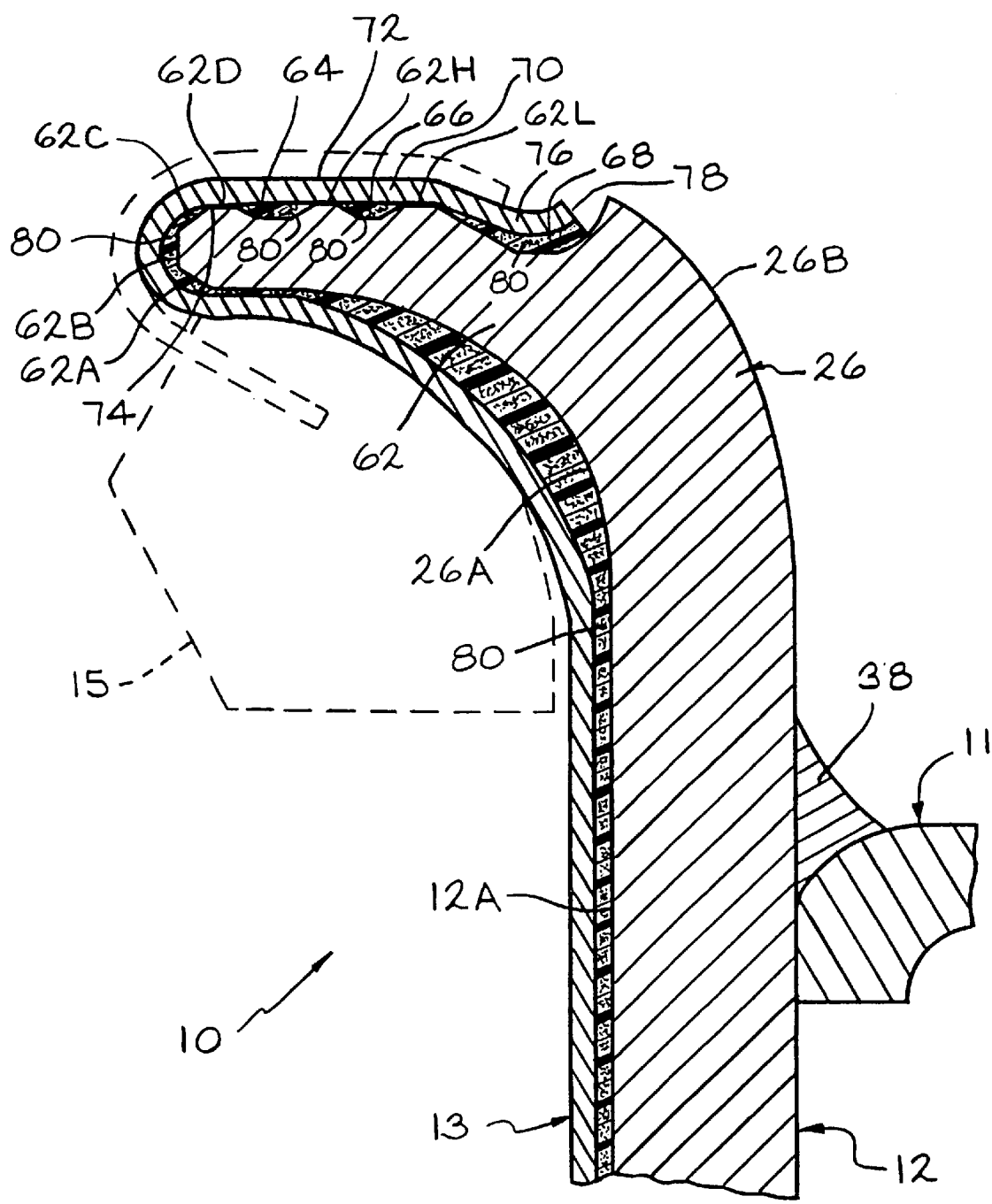
FIG. 3 is an enlarged sectional view of a selected portion of the vehicle wheel illustrated in FIG. 2.
Figure 4:
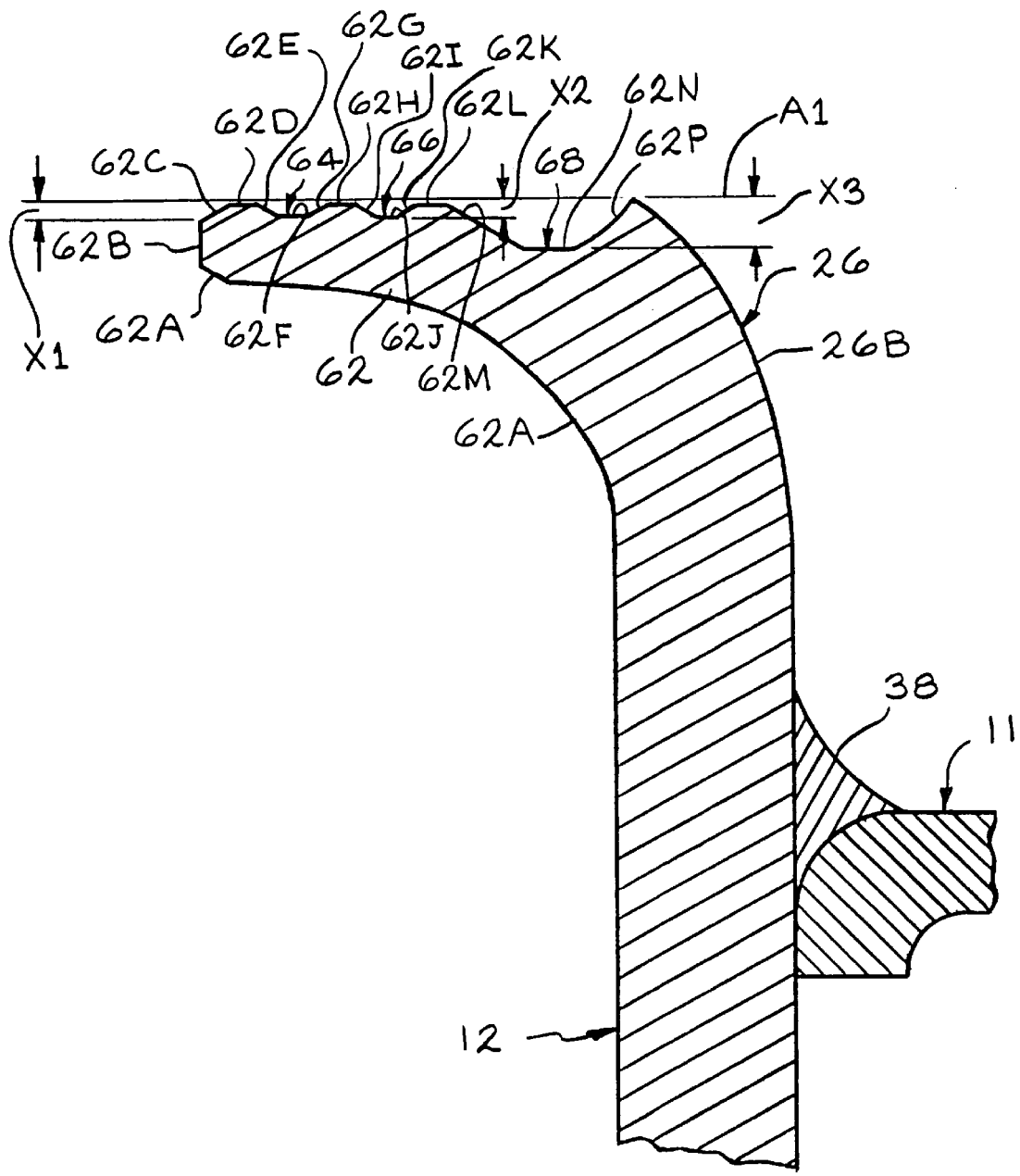
FIG. 4 is an enlarged sectional showing only the wheel disc illustrated in FIG. 3.

Referring now to the drawings, there is illustrated in FIG. 1 a sectional view of a first embodiment of a vehicle wheel, indicated generally at 10, including a vehicle wheel cover retention system in accordance with the present invention. The vehicle wheel 10 shown in this embodiment is a full face type of wheel, and includes a wheel rim 11, a full face wheel disc 12, a wheel cover 13, and a cap 14. Although this invention is discussed in conjunction with the particular wheel disclosed herein, it will be appreciated that the invention may be used in conjunction with other types of wheel constructions. For example, the vehicle wheel can be a "bead seat attached" wheel such as shown in FIG. 4 of U.S. Pat. No. 5,188,429 to Heck et al., a "well attached" wheel such as shown in FIG. 3 of Heck et al., a "bimetal" wheel construction including an aluminum disc and a steel rim such as shown in U.S. Pat. No. 5,421,642 to Wei et al., or a "modular wheel" construction including a "partial" rim and a full face wheel disc such as shown in U.S. Pat. No. 5,360,261 to Archibald et al., the disclosures of all of these patents incorporated herein by reference.

The wheel rim 11 is a fabricated wheel rim constructed of steel, aluminum, or other suitable alloy materials. The wheel rim 11 includes an inboard tire bead seat retaining flange 16, an inboard tire bead seat 18, a generally axially extending well 20, and an outboard tire bead seat 22. The wheel rim 11 further includes an opening (not shown) formed therein to accommodate a valve stem (not shown).

The wheel disc 12 is forged, cast, fabricated, or otherwise formed, and is constructed of steel, aluminum, or other suitable alloy materials. The wheel disc 12 includes a generally centrally located wheel mounting surface 24, and an outer annular portion 26. The wheel mounting surface 24 is provided with a centrally located pilot aperture 28, and a plurality of lug bolt receiving holes 30. The lug bolt receiving holes 30 receive lug bolts (not shown) for securing the vehicle wheel 10 on a vehicle axle (not shown).

Figure 2:
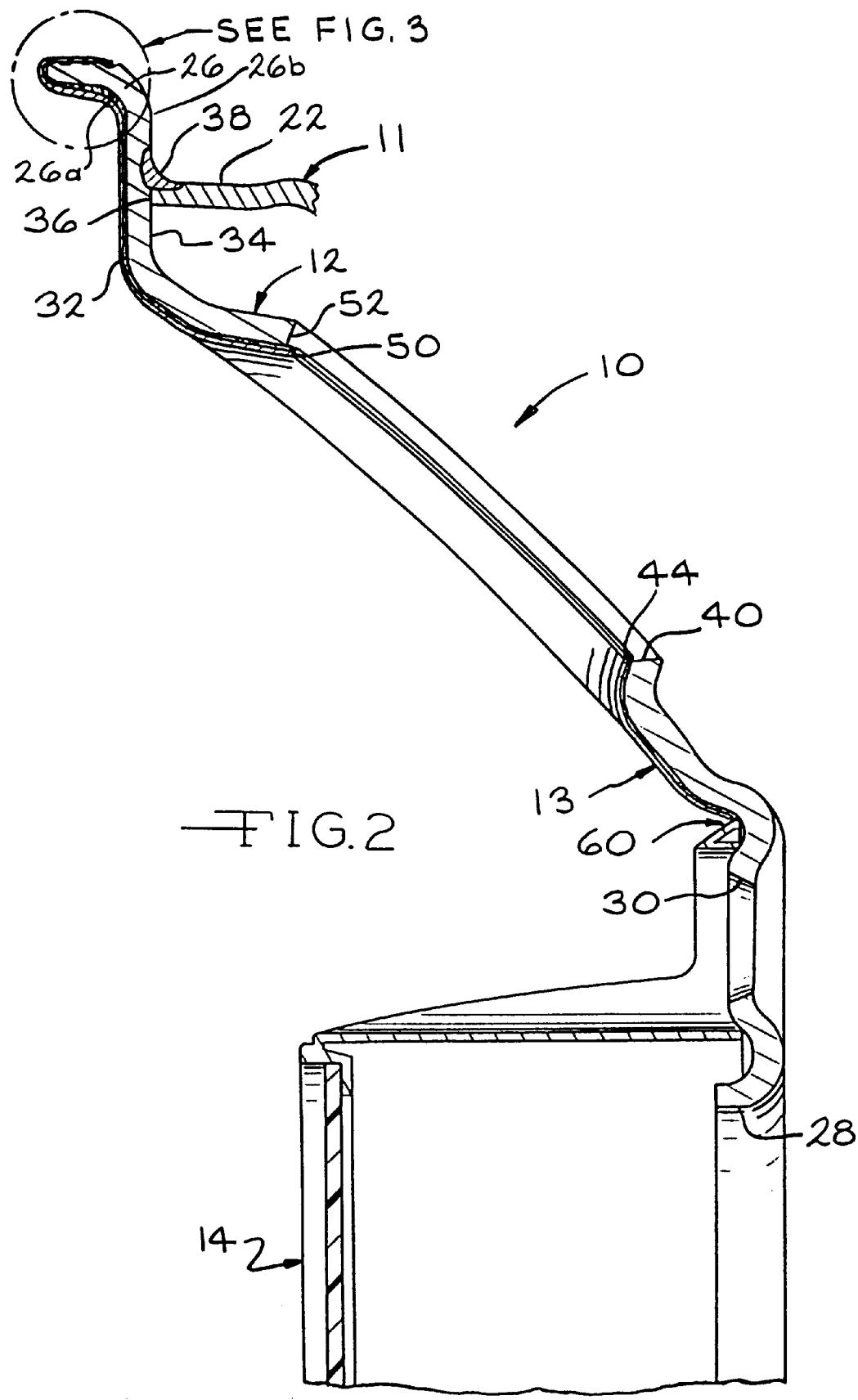
FIG. 2 is a sectional view of a selected portion of the vehicle wheel illustrated in FIG. 1.

The outer annular portion 26 of the wheel disc 12 defines an outboard tire bead seat retaining flange of the vehicle wheel 10, and includes an outer surface 26A and an inner surface 26B, shown in FIG. 2. To assemble the vehicle wheel 10, an outboard end 36 of the wheel rim 11 is positioned against the inner surface 26B of the wheel disc 12, and a weld 38 is provided to join the wheel disc 12 and the wheel rim 11 together as shown in FIG. 2. The wheel disc 12 further includes a plurality of decorative windows 40 (five windows 40 being illustrated). As shown in this embodiment, one of the windows 40 includes a cut-out portion 42 (shown in FIG. 1), to accommodate the valve stem.

The wheel cover 13 shown in this embodiment is preferably formed from stainless steel having a thickness in the range of about 0.010 inch to about 0.030 inch and, more preferably, having a thickness of approximately 0.020 inch, and is painted or chrome-plated. Alternatively, the wheel cover 16 may be formed from other metal and/or non-metal materials, such as for example, plastic which can be painted or chrome-plated.

The wheel cover 13 is prefabricated to generally match the particular configuration of the outboard facing surface 12A of the disc wheel 12. In particular, the wheel cover 13 includes a plurality of openings 44 which correspond to the windows 40 formed in the wheel disc 12, and an enlarged central opening 46. One of the openings 44 includes a cut-out portion 48 which generally corresponds to the cut-out 42 provided in the one window 40 to accommodate the valve stem. The openings 44 in the wheel cover 13 are preferably formed by a stamping operation. Also, as best shown in FIG. 2, edges 50 of the wheel cover openings 44 preferably extend slightly past edges 52 of the windows 40 to effectively overlap the edges 52 of the windows 40. As a result of this, when a wheel cover 13 which has been chrome-plated is joined to the wheel disc 12, the completely assembled vehicle wheel 10 of the present invention has the appearance of a "chrome-plated" vehicle wheel.

As shown in this embodiment, the cap 14 is secured to the wheel disc 12 by a plurality of fasteners 54 (only one fastener 54 being illustrated). The fasteners 54 extend through openings 56 formed in the cap 14, and are received in threaded inserts 58 which are secured in openings provided in the wheel mounting surface 24 of the wheel disc 12. The inner edge of the wheel cover 13 can either be located outside the edge of the cap 14 (as shown in FIG. 2 at 60), or, alternatively, can extend radially inwardly under the cap 14 (not shown).

As shown in FIGS. 3 and 4, the outboard tire bead seat retaining flange 26 of the wheel disc 12 includes an outer peripheral end 62 having a plurality of spaced apart annular grooves 64, 66, and 68 formed therein (three of such grooves being illustrated in this embodiment). Preferably, the outer peripheral end 62 and the grooves 64, 66, and 68 are formed by a machining operation to predetermined specifications. However, the outer peripheral end 62 and/or one or more of the groove 64, 66, and 68 can be formed by other methods. For example, the outer peripheral end 62 and/or one or more of the grooves 64, 66, and 68 can be formed by a stamping operation or a spinning operation. As shown in FIG. 4, the outer peripheral end 62 includes a first surface 62A, a second surface 62B, a third surface 62C, a fourth surface 62D, a fifth surface 62E, a sixth surface 62F, a seventh surface 62G, an eighth surface 62H, a ninth surface 62I, a tenth surface 62J, an eleventh surface 62K, a twelfth surface 62L, a thirteenth surface 62M, a fourteenth surface 62N, and a fifteenth surface 62P. Alternatively, the configuration of the outer peripheral end 62 can be other than illustrated if desired, and the number, spacing, and configuration of the grooves 64, 66, and 68 and/or one or more of the surfaces 62A through 62P can be other than illustrated if desired.

As shown in FIG. 4, the groove 64 formed in the inner surface 26B of the outboard tire bead seat retaining flange 26 extends in a generally radial direction to a predetermined maximum distance X1 measured from a line A1 (which is generally parallel with respect to the wheel axis A) to the surface 62F. The groove 66 formed in the inner surface 26B of the outboard tire bead seat retaining flange 26 extends in a generally radial direction to a predetermined maximum distance X2 from the line A1 to the surface 62J. The groove 68 formed in the inner surface 26B of the outboard tire bead seat retaining flange 26 extends in a generally radial direction to a predetermined maximum distance X3 from the line A1 to the surface 62N. In the illustrated embodiment, the distances X1 and X2 are generally equal to one another and less than the distance X3. Alternatively, one or more of the distances X1, X2, and X3 can be other than illustrated. As will be discussed below, the distance X3 is selected so that an outer peripheral end 78 of the wheel cover 13 is preferably completely recessed within the groove 68. Also, the outboard tire bead seat retaining flange 26 of the wheel disc 12 and the outer peripheral end 62 of the wheel cover 13 are designed to ensure that a wheel balance weight 15 (shown in phantom in FIG. 3), can be attached to the vehicle wheel 10.

Figure 5:
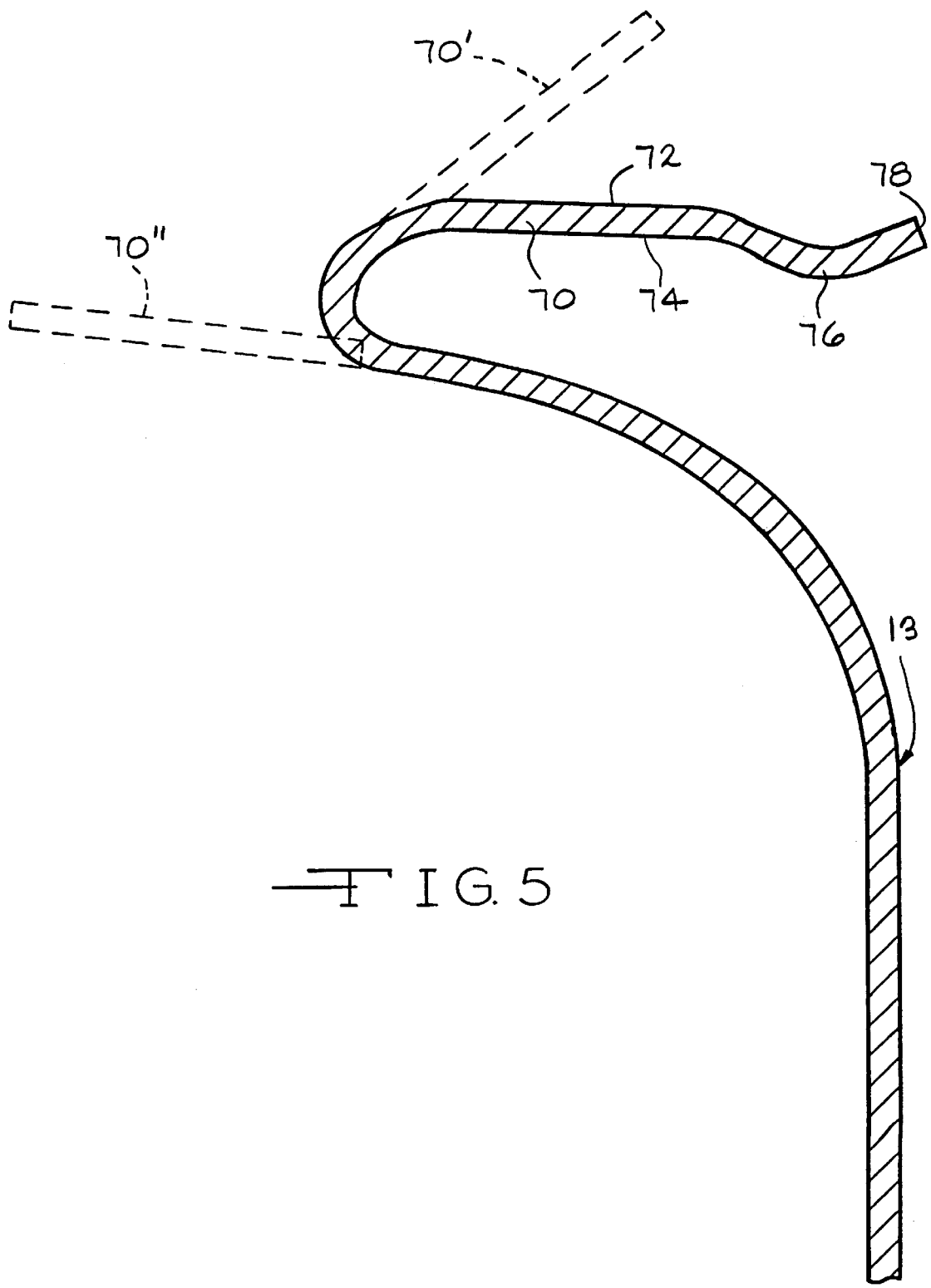
FIG. 5 is an enlarged sectional view showing only the wheel cover illustrated in 3

As shown in FIGS. 3 and 5, the wheel cover 13 include an outer end 70 which defines an outer surface 72, an inner surface 74, and an outer annular lip 76. The outer annular lip 76 defines an outer peripheral edge 78. As shown in this embodiment, the inner surface 74 of the wheel cover 13 contacts the adjacent surfaces 62D, 62E, and 62F of the disc wheel disc 12, and the outer annular lip 76 is slightly flared outwardly so that the outer peripheral edge 78 of the wheel cover 13 is spaced from the adjacent surfaces 62M, 62N, and 62P of the groove 68 for a purpose to be discussed below; however, in some instances, depending upon the uniformity of the outer annular lip 76 of the wheel cover 13, the contact between the wheel cover 13 and the wheel disc 12 can be other than illustrated.

In order to permanently secure the wheel cover 13 to the wheel disc 12, an adhesive/sealant 80 is utilized, such as a silicone or an epoxy. The adhesive/sealant 80 is preferably applied on the outboard face of the wheel disc 12 and the outer peripheral end 62 of the wheel disc 12 in a predetermined pattern so that when the wheel cover 13 is installed on the wheel disc 12, the adhesive 80 is effective to permanently secure the wheel cover 13 to the wheel disc 12 and also provides a seal between the wheel cover 13 and the wheel disc 12 which is effective to prevent water, mud, salt and other debris from entering between the wheel cover 13 and the outboard facing surface of the wheel disc 12. In addition, the adhesive 80 fills the grooves 64, 66, and 68 to further assist in securing the wheel cover 13 to the wheel disc 12 and also, the adhesive in the groove 68 further provides a seal to prevent water, mud, salt and other debris from entering between the outer annular lip 76 of the wheel cover 13 and the outboard tire bead seat retaining flange 26 of the wheel disc 13. Alternatively, the adhesive/sealant 80 can be applied to the inner surface of the wheel cover 13.

Referring now to FIGS. 6 through 8, there is illustrated a sequence of operations for producing the vehicle wheel 10 in accordance with this invention. As shown therein, the wheel cover 13 includes the outer end 70 which is prefabricated in such a manners so as to generally resemble the particular configuration of the outboard facing surface 12A of the wheel disc 12, including the outer end 62 thereof. In particular, the wheel cover 13 includes a prefabricated generally U-shaped outer end 70 which generally matches the profile of the outer peripheral end 62 of the wheel disc 12.

To install the wheel cover 13, initially, as shown in FIG. 6, the wheel cover 13 is positioned adjacent the outboard facing surface 12A of the wheel disc 12 with a tool 82 positioned adjacent a portion of an outer surface 13A of the wheel cover 13. As shown in this embodiment, the adhesive 80 is preferably applied to the outboard facing surface 12A of the disc 12. Alternatively, the adhesive 80 can be selectively applied to an inner surface 13B of the wheel cover 13; or can be selectively applied to both the outboard facing surface 12A of the disc 12 and the inner surface 13B of the wheel cover 13.

Next, as shown in FIG. 7, the tool 82 is moved axially toward the wheel disc 12 to bias the outer end 70 of the wheel cover 13 against the adjacent surface of the outer peripheral end 62 of the wheel disc 12 and force open the outer end 70 of the wheel cover 13. The tool 82 is further moved axially toward the wheel disc 12 so as to space the inner surface 13B of the wheel cover 13 a predetermined distance P from the outboard facing surface 12A of the wheel disc 12 such that there is a sufficient thickness of adhesive 80 at the interface between the wheel disc 12 and the wheel cover 13, as shown in FIG. 8. At the same time, the outer end 70 of the wheel cover 13 springs back to its prefabricated profile and is received in the groove 68.

Turning now to FIGS. 9 through 11 and using like reference numbers for corresponding parts, there is illustrated a sequence of operations for securing the wheel cover 13 to the wheel disc 12 to produce the vehicle wheel 10 in accordance with this invention. The wheel cover 13 illustrated in FIG. 9 includes the preformed outer end 70' shown in phantom in FIG. 5. As shown therein, the preformed outer end 70' has a generally U-shaped configuration which generally corresponds to the configuration of the outer peripheral end 62 of the wheel disc 12. Alternatively, the wheel cover 13 can include the preformed outer end 70" (shown in phantom in FIG. 5).

Initially, as shown in FIG. 9, the wheel cover 13 is positioned adjacent the outboard facing surface 12A of the wheel disc 26 with a tool 84 positioned adjacent a portion of an outer surface 13A of the wheel cover 13. In this embodiment, the adhesive/sealant 80 is preferably applied to the outboard facing surface 12A of the wheel disc 12 in a predetermined pattern. Next, as shown in FIG. 10, the tool 84 is moved axially toward the wheel disc 12 and presses the wheel cover 13 against the wheel disc 12 in a predetermined position. In particular, the tool 84 is effective to space the inner surface 13B of the wheel cover 13 a predetermined distance P1 from the outboard facing surface 12A of the disc 12 such that there is a sufficient thickness of adhesive/sealant 80 at the interface between the wheel disc 12 and the wheel cover 13.

Following this, the outer end 70' of the wheel cover 13 is subjected to a flow spinning operation. During the flow spinning operation, an outer surface of the outer end 70' of the wheel cover 13 is engaged by a tool end 86 of a spinning tool 88. The spinning tool 88 is mounted on a support member (not shown) which allows the spinning tool 88 to generally travel parallel to the profile of the outer peripheral end 62 of the wheel disc 12. As shown in this embodiment, the spinning tool 88 is advanced in the direction of the arrow 90 to deform the outer end 70' of the wheel cover 13 and produce the finished vehicle wheel 10. In the illustrated embodiment, since the wheel cover 13 is formed from a relatively strong material, this movement does not cause a thinning of the thickness of the wheel cover 13 but only is effective to deform the outer end 70' of the wheel cover 13 to a desired final shape wherein the outer peripheral end 78 of the wheel cover 13 is preferably completely recessed within the groove 68. Alternatively, the flow spinning operation can cause some thinning of the outer end 70' of the wheel cover 13, especially if the wheel cover 13 is constructed of some other materials, such as for example, alumimum.

Figure 12:
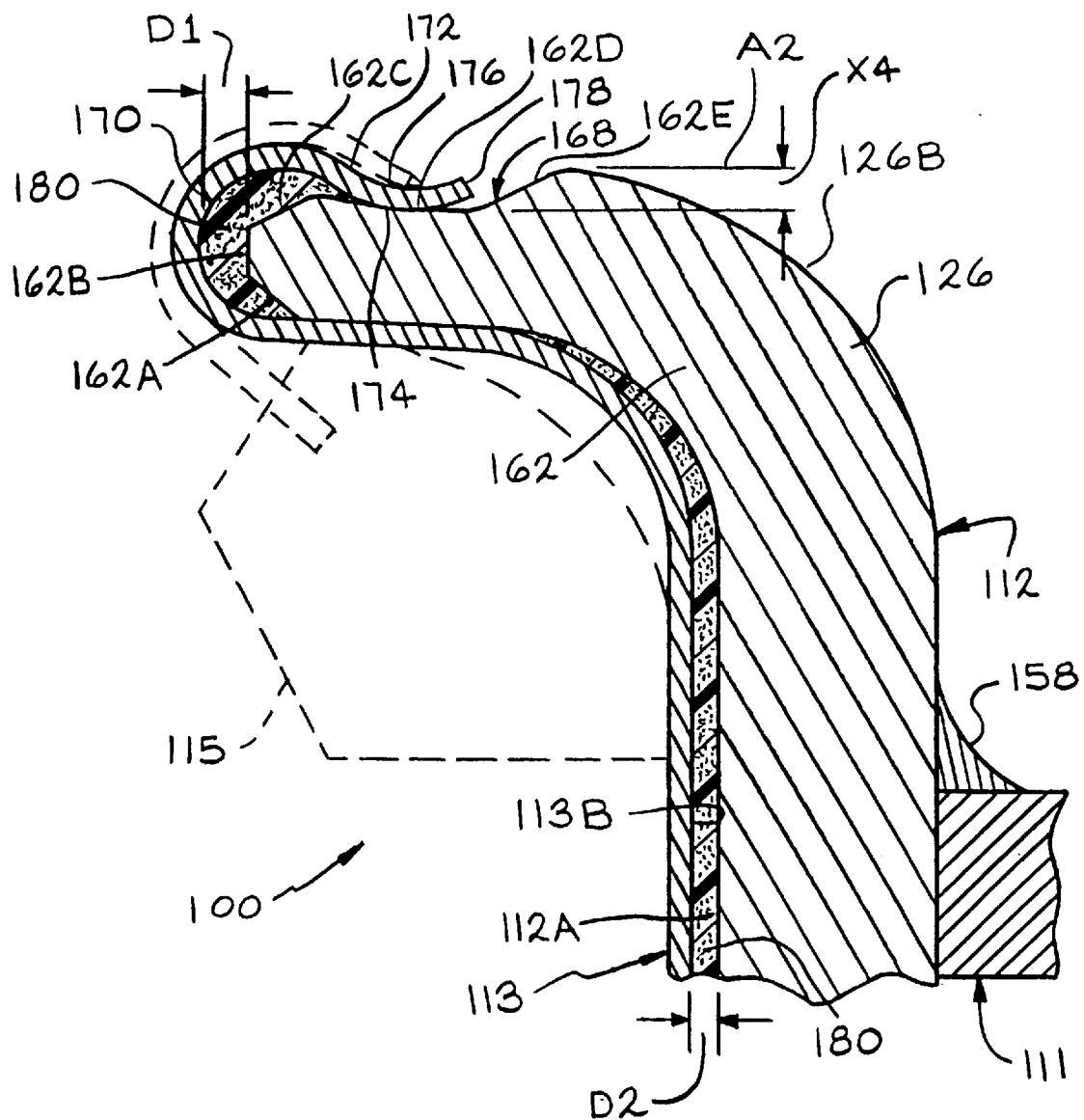
FIG. 12 is an enlarged sectional view of a selected portion of a second embodiment of an improved vehicle wheel constructed in accordance with the present invention.

Turning now to FIG. 12, there is illustrated a sectional view of a portion of a second embodiment of a vehicle wheel, indicated generally at 100, including a vehicle wheel cover retention system in accordance with the present invention. The vehicle wheel includes a wheel rim 111 joined to a full face wheel disc 112 by a weld 158, and a wheel cover 113 secured to the wheel disc 112 by an adhesive/sealant 180.

Figure 13:
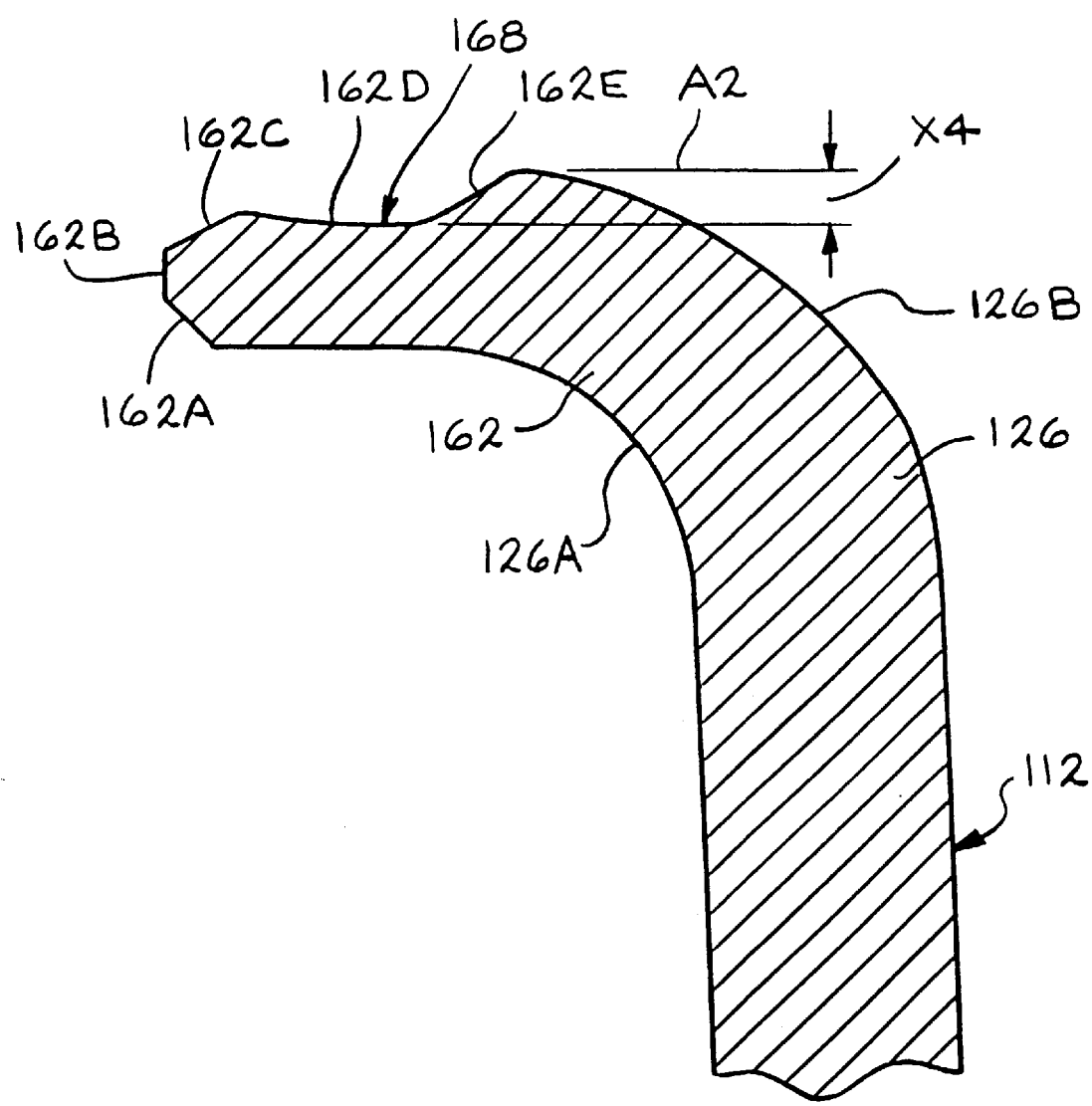
FIG. 13 is an enlarged sectional showing only the wheel disc illustrated in FIG. 12.

As shown in FIGS. 12 and 13, an outboard tire bead seat retaining flange 126 of the wheel disc 112 includes an outer peripheral end 162 having an annular groove 168 formed therein. Preferably, the outer peripheral end 162 and the groove 168 are formed by a machining operation to predetermined specifications. However, the outer peripheral end 162 and/or the groove 168 can be formed by other methods. For example, the outer peripheral end 162 and/or the groove 168 can be formed by a stamping operation or a spinning operation. The outer peripheral end 162 includes a first surface 1 62A, a second surface 162B, a third surface 162C, a fourth surface 162D, and a fifth surface 162E. Alternatively, the configuration of the outer peripheral end 162 can be other than illustrated if desired, and the number, spacing, and configuration of the groove 168 and/or one or more of the surfaces 162A through 162E can be other than illustrated if desired. As shown in FIGS. 12 and 13, the groove 168 formed in the board tire bead seat retaining flange 126 extends in a generally radial direction to a predetermined maximum distance X4 from a line A2 (which is generally parallel to the wheel axis) to the surface 162D. As will be discussed below, the distance X4 is selected so that an outer peripheral end 178 of the wheel cover 113 is preferably completely recessed within the groove 168. Also, the outboard tire bead seat retaining flange 126 of the wheel disc 112 and the outer peripheral end 162 of the wheel cover 113 are designed to ensure that a wheel balance weight 115 (shown in phantom in FIG. 12), can be attached to the vehicle wheel 100.

Figure 14:
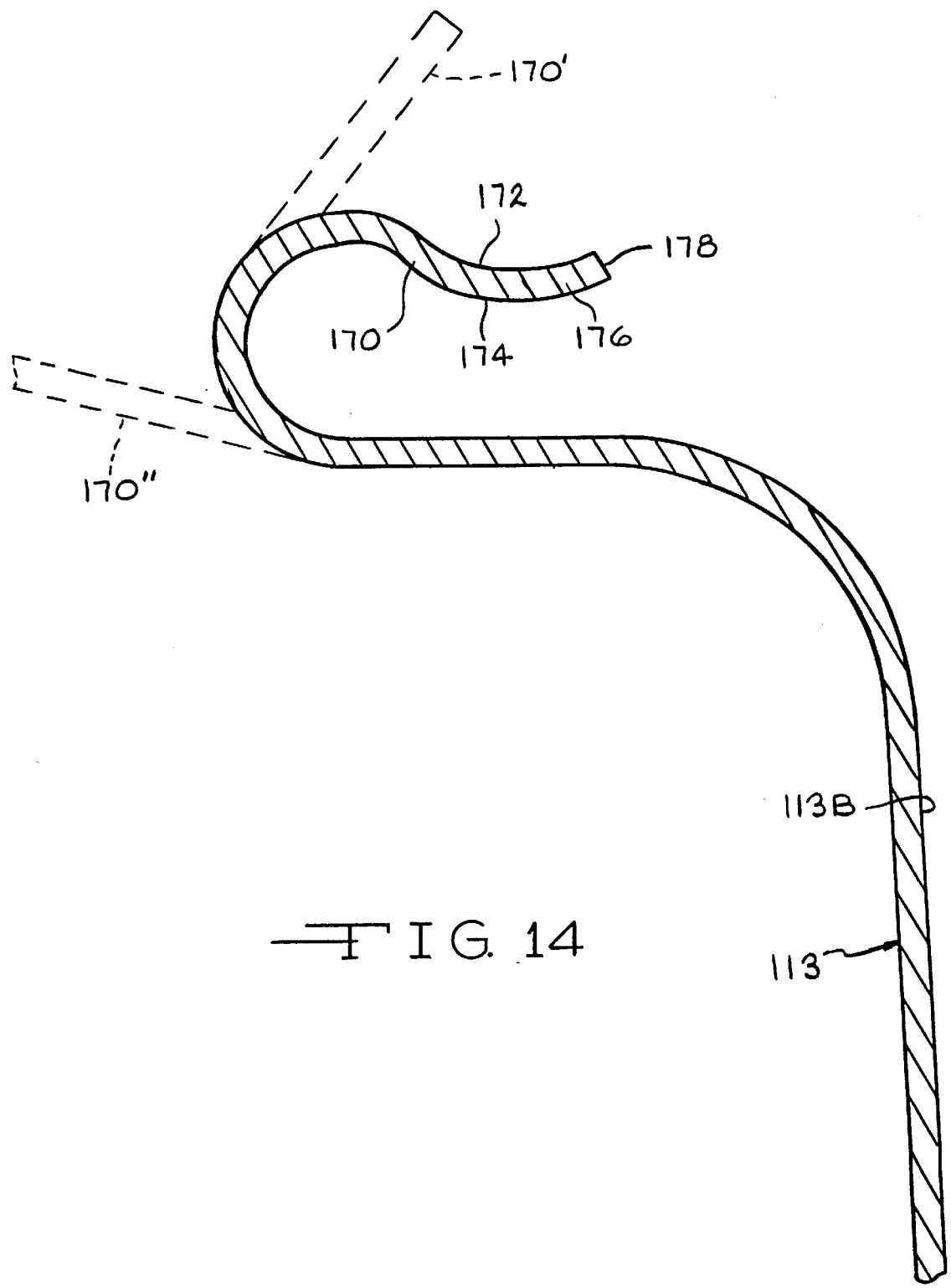
FIG. 14 is an enlarged sectional view showing only the wheel cover illustrated in 12.

As shown in FIG. 12, the wheel cover 113 include an outer end 170 which defines an outer surface 172, an inner surface 174, and an outer annular lip 176. The outer annular lip 176 defines the outer peripheral edge 178. As shown in this embodiment, a portion of the inner surface 174 of the wheel cover 113 contacts the adjacent surface 162D of the disc wheel disc 112, and the outermost end of the outer annular lip 176 is slightly flared outwardly so that the outer peripheral edge 178 of the wheel cover 113 is spaced from the adjacent surfaces 162D and 162E of the groove 168; however, in some instances, depending upon the uniformity of the outer annular lip 176 of the wheel cover 113, the contact between the wheel cover 113 and the wheel disc 112 can be other than illustrated. Preferably, the outer end 170 of the wheel cover 113 is prefabricated to generally match the particular configuration of an outboard facing surface 112A of the wheel disc 112. Alternatively, the wheel cover 112 can include partially formed outer ends 170' and 170" shown in phantom in FIG. 14.

As shown in the embodiment illustrated in FIG. 12, the inner surface 174 of the wheel cover 113 is also spaced from the adjacent surfaces 162A, 162B, and 162C of the wheel disc 112; however, in some instances, depending upon the dimensional uniformity of the wheel cover 113, there could be contact between the inner surface of the wheel cover 113 and one or more of the surfaces 162A, 162B, and 162C of the wheel disc 112. To ensure that the inner surface 174 of the wheel cover 113 does not contact the adjacent surfaces 162A, 162B, and 162C of the wheel disc 112, the inner surface 174 of the wheel cover 113 is spaced from the surface 162B of the wheel disc 112 by a predetermined distance D1 which is greater than a distance D2 defined between the inner surface 113B of the wheel cover 113 and the outboard facing surface 112A of the wheel disc 112.

Figure 15:
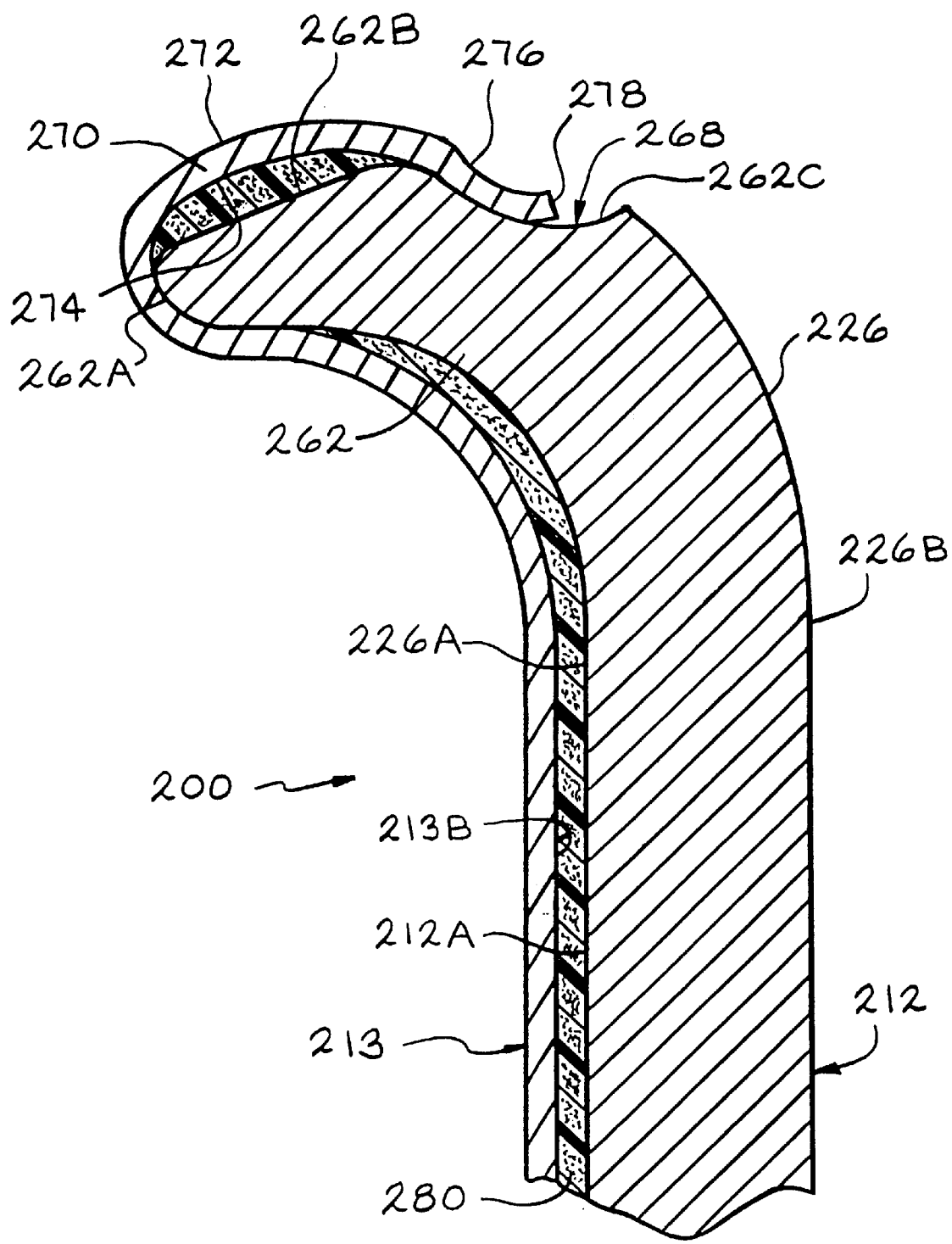
FIG. 15 is an enlarged sectional view of a selected portion of a third embodiment of an improved vehicle wheel constructed in accordance with the present invention.

Turning now to FIG. 15, there is illustrated a selected portion of a third embodiment of a vehicle wheel, indicated generally at 200, including a vehicle wheel cover retention system in accordance with the present invention. The vehicle wheel 200 includes a wheel portion 212 (which can be a portion of a wheel disc or a wheel rim) and a wheel cover 213 secured thereto by an adhesive/sealant 280. The wheel portion 212 includes an outer annular portion 226 which defines an outboard tire bead seat retaining flange of the vehicle wheel 200, and includes an outer surface 226A and an inner surface 226B. The wheel cover 213 is prefabricated to generally match the particular configuration of the outboard facing surface 212A of the wheel portion 212

The outboard tire bead seat retaining flange 226 of the wheel portion 212 includes an outer peripheral end 262 and an annular groove 268 formed therein. Preferably, the outer peripheral end 262 and the groove 268 are formed by a machining operation to predetermined specifications. However, the outer peripheral end 262 and/or the groove 268 can be formed by other methods. For example, the outer peripheral end 262 and/or the groove 268 can be formed by a stamping operation or a spinning operation. The outer peripheral end 262 includes a first surface 262A, a second surface 262B, and a third surface 262C. Alternatively, the configuration of the outer peripheral end 262 can be other than illustrated if desired, and the number, spacing, and configuration of the groove 268 and/or one or more of the surfaces 262A through 262C can be other than illustrated if desired.

As shown in FIG. 15, the wheel cover 213 include an outer end 270 which defines an outer surface 272, an inner surface 274, and an outer annular lip 276. The outer annular lip 276 defines an outer peripheral edge 278. As shown in this embodiment, the inner surface 274 of the wheel cover 213 does not contact the adjacent surface 262B of the wheel portion 212, and the inner surface 274 contacts substantially the entire adjacent surface 262A of the wheel portion 212 and a portion of the adjacent surface 262C of the wheel portion 212; however, in some instances, depending upon the uniformity of the outer annular lip 276 of the wheel cover 213, the contact between the wheel cover 213 and the wheel portion 212 can be other than illustrated.

In order to permanently secure the wheel cover 213 to the wheel portion 212, an adhesive/sealant 280 is utilized, such as a silicone or an epoxy. The adhesive/sealant 280 is preferably applied on the outboard facing surface 212A of the wheel portion 212 and the outer peripheral end 262 of the wheel portion 212 in a predetermined pattern so that when the wheel cover 213 is installed on the wheel portion 212, the adhesive/sealant 280 is effective to permanently secure the wheel cover 213 to the wheel portion 212 and also provides a seal between the wheel cover 213 and the wheel portion 212 which is effective to prevent water, mud, salt and other debris from entering between the wheel cover 213 and the outboard facing surface 212A of the wheel portion 212. In addition, the adhesive/sealant 280 fills any gaps or spaces between the surfaces 262A and 262B of the outer peripheral end 262 and the inner surface 274 of the wheel cover 213 to further assist in securing the wheel cover 213 to the wheel portion 212 and also to prevent water, mud, salt and other debris from entering between the outer annular lip 270 of the wheel cover 213 and the outboard tire bead seat retaining flange 226 of the wheel disc 213. Alternatively, the adhesive/sealant 280 can be selectively applied to the inner surface 213B of the wheel cover 213 (not shown); or selectively applied to both the outboard facing surface 212A of the wheel portion 212 and the inner surface 213B of the wheel cover 213.

Referring now to FIGS. 16 through 18, there is illustrated a sequence of operations for producing the vehicle wheel 200 in accordance with this invention. As shown therein, the wheel cover 213 includes the outer end 270 which is prefabricated in such a manners so as to generally resemble the particular configuration of the outboard facing surface 212B of the wheel disc 212, including the outer end 262 thereof. In particular, the wheel cover 213 includes a prefabricated generally U-shaped outer end 270 which generally matches the profile of the outer peripheral end 262 of the wheel disc 212. Alternatively, the wheel cover 212 can include partially formed outer ends 270' and 270" shown in phantom in FIG. 16.

To install the wheel cover 213, initially, as shown in FIG. 16, the wheel cover 213 is positioned adjacent the outboard facing surface 212A of the wheel portion 212 with a tool (not shown but can be similar to the tool 82 shown in FIGS. 6 through 8) positioned adjacent a portion of an outer surface 213A of the wheel cover 213. As shown in this embodiment, the adhesive/sealant 280 is preferably applied to the outboard facing surface 212A of the wheel portion 212. Alternatively, the adhesive/sealant 280 can be selectively applied to an inner surface 213B of the wheel cover 213 (not shown); or selectively applied to both the outboard facing surface 212A of the wheel portion 212 and the inner surface 213B of the wheel cover 213.

Next, as shown in FIG. 17, the tool is moved axially toward the wheel portion 212 to bias the outer end 270 of the wheel cover 213 against the adjacent surface of the outer peripheral end 262 of the wheel disc 212 and force open the outer end 270 of the wheel cover 213. The tool is further moved axially toward the wheel disc 212 so as to space the inner surface 213B of the wheel cover 213 a predetermined distance from the outboard facing surface 212A of the wheel portion 212 such that there is a sufficient thickness of adhesive/sealant 280 at the interface between the wheel portion 212 and the wheel cover 213, as shown in FIG. 18. At the same time, the outer end 270 of the wheel cover 213 springs back to its prefabricated profile and is received in the groove 268.

Figure 19:
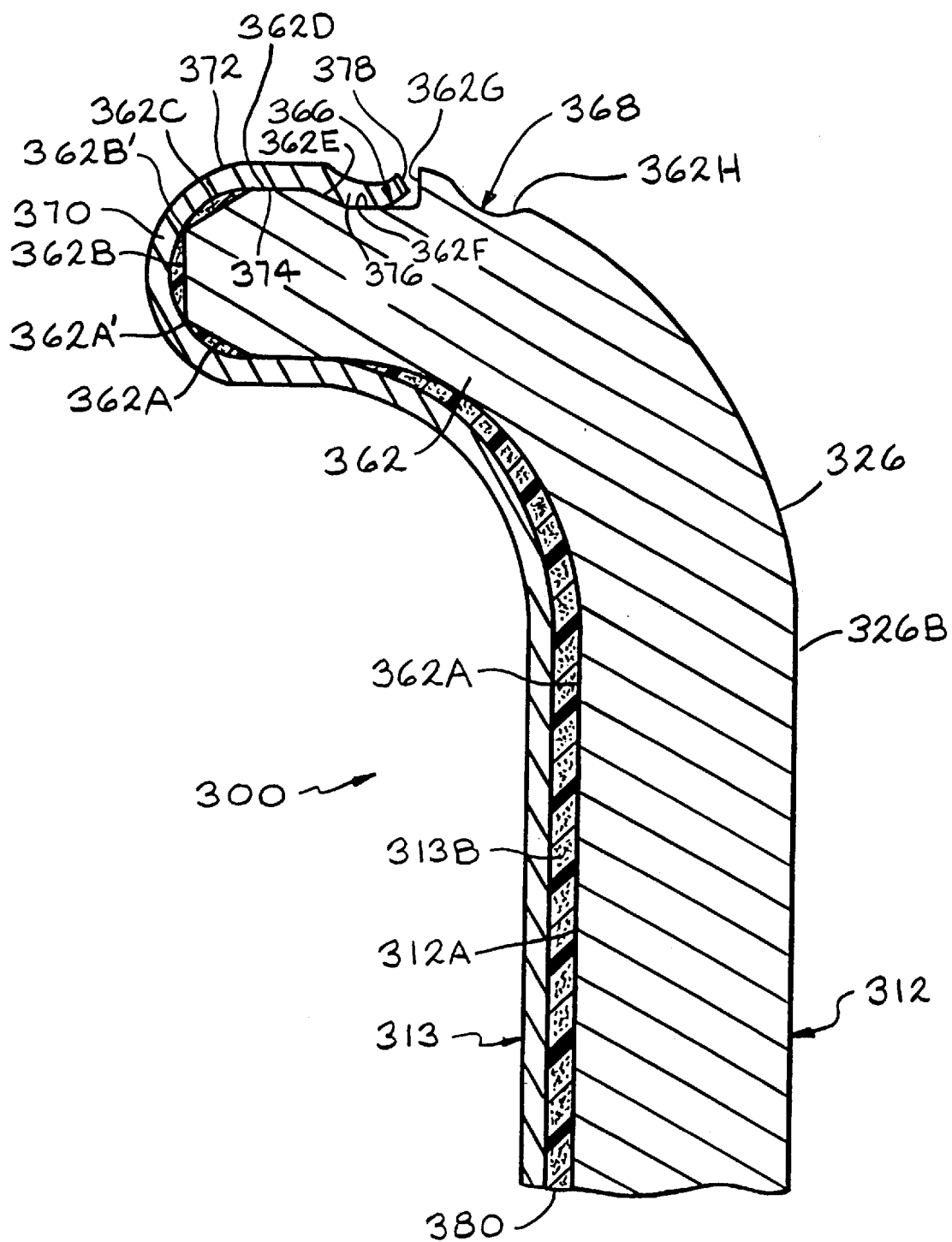
FIG. 19 is an enlarged sectional view of a selected portion of a fourth embodiment of an improved vehicle wheel constructed in accordance with the present invention.

Turning now to FIG. 19, there is illustrated a selected portion of a fourth embodiment of a vehicle wheel, indicated generally at 300, including a vehicle wheel cover retention system in accordance with the present invention. The vehicle wheel 300 includes a wheel portion 312 and a wheel cover 313 secured thereto. The wheel portion 312 includes an outer annular portion 326 which defines an outboard tire bead seat retaining flange of the vehicle wheel 300, and includes an outer surface 326A and an inner surface 326B. The wheel cover 313 is prefabricated to generally match the particular configuration of an outboard facing surface 312A of the wheel portion 312

The outboard tire bead seat retaining flange 326 of the wheel portion 312 includes an outer peripheral end 362 and a pair of annular grooves 366 and 368 formed therein. Preferably, the outer peripheral end 362 and the grooves 366 and 368 are formed by a machining operation to predetermined specifications. However, the outer peripheral end 362 and/or one or both of the grooves 366 and 368 can be formed by other methods. For example, the outer peripheral end 362 and/or one or both of the grooves 366 and 368 can be formed by a stamping operation or a spinning operation. The outer peripheral end 362 includes a first surface 362A, a second surface 362B, a third surface 362C, a fourth surface 362D, a fifth surface 362E, a sixth surface 362F, a seventh surface 362G, an eighth surface 362H. Alternatively, the configuration of the outer peripheral end 362 can be other than illustrated if desired, and the number, spacing, and configuration of one or both of the grooves 366 and 368 and/or one or more of the surfaces 362A through 362H can be other than illustrated if desired.

As shown in FIGS. 19, the wheel cover 313 include an outer end 370 which defines an outer surface 372, an inner surface 374, and an outer annular lip 376. The outer annular lip 376 defines an outer peripheral edge 378. As shown in this embodiment, the inner surface 374 of the wheel cover 313 contact substantially the entire length of the surfaces 362D and 362E; the inner surface 374 of the wheel cover 313 only contacts the transitional edge surfaces 362A' and 362B' defined between respective surfaces 362A and 362B and 362B and 362C; and the outer peripheral edge 378 of the wheel cover 313 does not contact the adjacent surface 362G of the wheel portion 312 however, in some instances, depending upon the uniformity of the outer annular lip 376 of the wheel cover 313, the contact between the wheel cover 313 and the wheel portion 312 can be other than illustrated.

In order to permanently secure the wheel cover 313 to the wheel portion 312, an adhesive/sealant 380 is utilized, such as a silicone or an epoxy. The adhesive/sealant 380 is preferably selectively applied on the outboard facing surface 312A of the wheel portion 312 and the outer peripheral end 362 of the wheel portion 312 in a predetermined pattern so that when the wheel cover 313 is installed on the wheel portion 312, the adhesive/sealant 380 is effective to permanently secure the wheel cover 313 to the wheel portion 312 and also provides a seal between the wheel cover 313 and the wheel portion 312 which is effective to prevent water, mud, salt and other debris from entering between the wheel cover 313 and the outboard facing surface 312A of the wheel portion 312. In addition, the adhesive/sealant 380 fills any gaps or spaces between the surfaces 362A, 362B, 362C, 362D, and 362E of the outer peripheral end 362 and the inner surface 374 of the wheel cover 313 to further assist in securing the wheel cover 313 to the wheel portion 312 and also to prevent water, mud, salt and other debris from entering between the outer annular lip 370 of the wheel cover 313 and the outboard tire bead seat retaining flange 326 of the wheel portion 312. Alternatively, the adhesive/sealant 380 can be selectively applied to the inner surface 313B of the wheel cover 313 (not shown); or selectively applied to both the outboard facing surface 312A of the wheel portion 312 and the inner surface 313B of the wheel cover 313.

Figure 20:
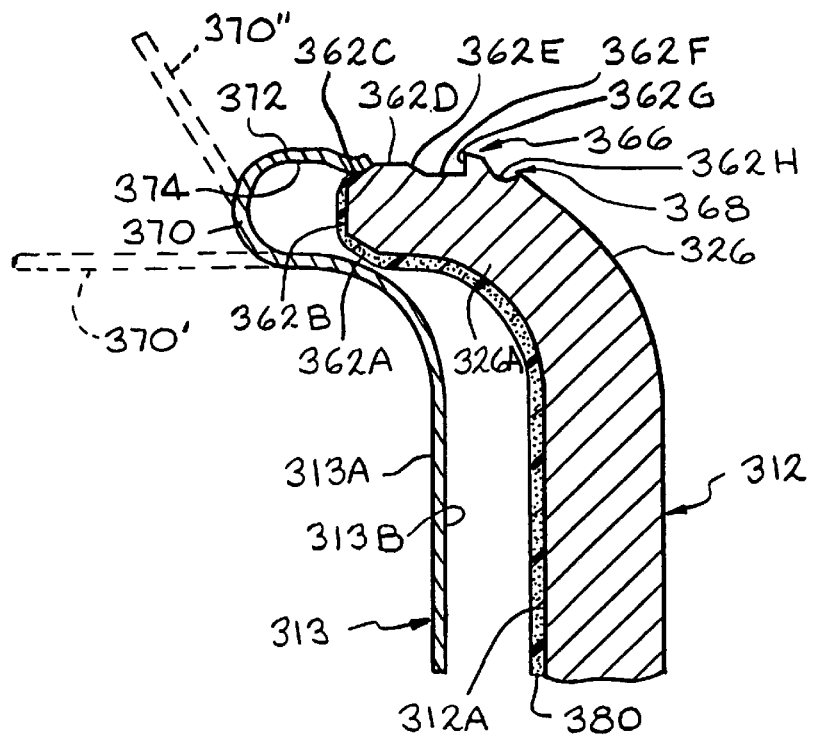
FIG. 20 is a sectional view showing an initial installation operation of the wheel cover illustrated in FIG. 19.
Figure 21:
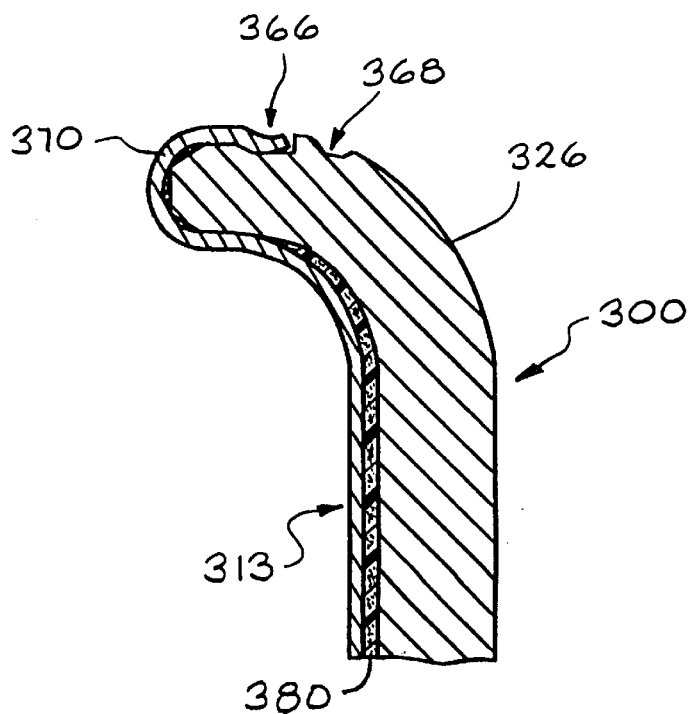
FIG. 21 is a sectional view showing the final installation operation of the wheel cover illustrated in FIG. 19.

Referring now to FIGS. 20 and 21, there is illustrated a sequence of operations for producing the vehicle wheel 300 in accordance with this invention. As shown therein, the wheel cover 313 includes the outer end 370 which is prefabricated in such a manners so as to generally resemble the particular configuration of the outboard facing surface 312B of the wheel portion 312, including the outer end 362 thereof. In particular, the wheel cover 313 includes a prefabricated generally U-shaped outer end 370 which generally matches the profile of the outer peripheral end 362 of the wheel portion 312. Alternatively, the wheel cover 112 can include partially formed outer ends 370' and 370" shown in phantom in FIG. 15.

To install the wheel cover 313, initially, the wheel cover 313 is positioned adjacent the outboard facing surface 312A of the wheel disc 312 with a tool (not shown but can be similar to the tool 82 shown in FIGS. 6 through 8) positioned adjacent a portion of an outer surface 313A of the wheel cover 313. As shown in this embodiment, the adhesive/sealant 380 is preferably applied to the outboard facing surface 312A of the wheel portion 312. Alternatively, the adhesive/sealant 380 can be selectively applied to an inner surface 313B of the wheel cover 313; or selectively applied to both the outboard facing surface 312A of the wheel portion 312 and the inner surface 313B of the wheel cover 313.

Next, the tool is moved axially toward the wheel portion 312 to bias the outer end 370 of the wheel cover 313 against the adjacent surface of the outer peripheral end 362 of the wheel portion 312 and force open the outer end 370 of the wheel cover 313. The wheel cover 313 is further moved axially toward the wheel portion 312 so as to space the inner surface 313B of the wheel cover 313 a predetermined distance from the outboard facing surface 312A of the wheel portion 312 such that there is a sufficient thickness of the adhesive/sealant 380 at the interface between the wheel portion 312 and the wheel cover 313, as shown in FIGS. 19 and 21. At the same time, the outer end 370 of the wheel cover 313 springs back to its prefabricated profile and is received in the groove 366 to thereby produce the vehicle wheel 300.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A vehicle wheel defining an axis and comprising:
   a wheel disc defining an outboard facing wheel surface and including an outboard tire bead seat retaining flange, said outboard bead seat retaining flange including an outer peripheral end and an inner surface having at least one annular groove formed therein;
   a wheel cover covering at least a portion of said outboard facing wheel surface and the entire portion of said outer peripheral end of said outboard bead seat retaining flange, said wheel cover including an outer end; and
   an adhesive disposed in said annular groove to secure said outer end of said wheel cover to said outer peripheral end of said wheel disc and to provide a seal to prevent water, mud, salt and other debris from entering between said outer end of said wheel cover and said outer peripheral end of said wheel disc;
   wherein said outer peripheral end includes a plurality of spaced apart annular grooves formed therein.

2. The vehicle wheel defined in claim 1 wherein said outer peripheral end of said wheel disc defines at least a first surface, a second surface, and a third surface, said outer end of said wheel cover defines an outer surface, an inner surface, and an outer annular lip which defines an outer peripheral edge, said inner surface of said wheel cover being spaced apart from at least one of said first surface, said second surface, and said third surface of said outer peripheral end so as to define a gap therebetween, and said adhesive is disposed in said gap.

3. The vehicle wheel defined in claim 1 wherein said outer end of said wheel cover includes an outwardly flared outer annular lip which defines an outer peripheral edge of said wheel cover, and said groove extends in a generally radial direction to a predetermined depth which completely recesses said outer peripheral edge of said wheel cover within said groove.

4. The vehicle wheel defined in claim 1 wherein said wheel cover is prefabricated to generally match said outboard facing wheel surface of said wheel disc.

5. The vehicle wheel defined in claim 1 wherein said adhesive is selectively applied on said outboard facing wheel surface of said wheel disc and said outer peripheral end of said wheel disc in a predetermined pattern.

6. The vehicle wheel defined in claim 1 wherein selected portions of said wheel cover are spaced apart from said outboard facing wheel surface of said wheel disc.

7. A vehicle wheel defining an axis and comprising:
   a wheel disc defining an outboard facing wheel surface and including an outboard tire bead seat retaining flange, said outboard bead seat retaining flange including an outer peripheral end and an inner surface having at least one annular groove formed therein;
   a wheel cover covering at least a portion of said outboard facing wheel surface and the entire portion of said outer peripheral end of said outboard bead seat retaining flange, said wheel cover including an outer end which includes an outwardly flared outer annular lip which defines an outer peripheral edge of said wheel cover; and
   an adhesive disposed in said annular groove to secure said outer end of said wheel cover to said outer peripheral end of said disc and to provide a seal to prevent water, mud, salt and other debris from entering between said outer end of said wheel cover and said outer peripheral end of said disc;
   wherein said groove extends in a generally radial direction to a predetermined depth which completely recesses said outer peripheral edge of said wheel cover within said groove.

8. The vehicle wheel defined in claim 7 wherein said outer peripheral end includes a plurality of spaced apart annular grooves formed therein.

9. The vehicle wheel defined in claim 7 wherein said outer peripheral end of said wheel disc defines at least a first surface, a second surface, and a third surface, said outer end of said wheel cover defines an outer surface, an inner surface, and an outer annular lip which defines an outer peripheral edge, said inner surface of said wheel cover being spaced apart from at least one of said first surface, said second surface, and said third surface of said outer peripheral end so as to define a gap therebetween, and said adhesive is disposed in said gap.

10. The vehicle wheel defined in claim 3 wherein said wheel cover is prefabricated to generally match said outboard facing wheel surface of said wheel disc.

11. The vehicle wheel defined in claim 7 wherein said adhesive is selectively applied on said outboard facing wheel surface of said wheel disc and said outer peripheral end of said wheel disc in a predetermined pattern.

12. The vehicle wheel defined in claim 7 wherein selected portions of said wheel cover are spaced apart from said outboard facing wheel surface of said wheel disc.

13. A vehicle wheel defining an axis and comprising:
   a wheel disc defining an outboard facing wheel surface and including an outboard tire bead seat retaining flange, said outboard bead seat retaining flange including an outer peripheral end and an inner surface having at least one groove formed therein;
   a wheel cover covering at least a portion of said outboard facing wheel surface and the entire portion of said outer peripheral end of said outboard bead seat retaining flange, said wheel cover including an outer end which includes an outer annular lip which defines an outer peripheral edge of said wheel cover; and
   an adhesive disposed in said groove to secure said outer end of said wheel cover to said outer peripheral end of said disc and to provide a seal to prevent water, mud, salt and other debris from entering between said outer end of said wheel cover and said outer peripheral end of said disc;
   wherein said groove in said inner surface extends to a predetermined depth which completely recesses said outer peripheral edge of said wheel cover within said groove.

14. The vehicle wheel defined in claim 13 wherein said groove is a generally annular groove.

15. The vehicle wheel defined in claim 13 wherein said outer peripheral end includes a plurality of spaced apart grooves formed therein.

16. The vehicle wheel defined in claim 13 wherein said outer peripheral end of said wheel disc defines at least a first surface, a second surface, and a third surface, said outer end of said wheel cover defines an outer surface, an inner surface, and an outer annular lip which defines an outer peripheral edge, said inner surface of said wheel cover being spaced apart from at least one of said first surface, said second surface, and said third surface of said outer peripheral end so as to define a gap therebetween, and said adhesive is disposed in said gap.

17. The vehicle wheel defined in claim 13 wherein said outer end of said wheel cover includes an outwardly flared outer annular lip which defines an outer peripheral edge of said wheel cover, and said groove in said inner surface extends to a predetermined depth which completely recesses said outer peripheral edge of said wheel cover within said groove.

18. The vehicle wheel defined in claim 13 wherein said wheel cover is prefabricated to generally match said outboard facing wheel surface of said wheel disc.

19. The vehicle wheel defined in claim 13 wherein said adhesive is selectively applied on said outboard facing wheel surface of said wheel disc and said outer peripheral end of said wheel disc in a predetermined pattern.

20. The vehicle wheel defined in claim 13 wherein selected portions of said wheel cover are spaced apart from said outboard facing wheel surface of said wheel disc.

* * * * *

UNITED STATES PATENT AND TRADEMARK OFFICE
CERTIFICATE OF CORRECTION

| | | |
|---|---|---|
| PATENT NO. | : 6,270,167 B1 | Page 1 of 1 |
| APPLICATION NO. | : 09/636240 | |
| DATED | : August 7, 2001 | |
| INVENTOR(S) | : James H. Kemmerer et al. | |

It is certified that error appears in the above-identified patent and that said Letters Patent is hereby corrected as shown below:

In Claim 10, column 12, line 16, delete "3" and insert --7--.

Signed and Sealed this

Thirty-first Day of July, 2007

JON W. DUDAS
*Director of the United States Patent and Trademark Office*